(12) United States Patent
Sakai (10) Patent No.: US 8,406,186 B2
(45) Date of Patent: Mar. 26, 2013

(54) TERMINAL DEVICE AND FEEDBACK METHOD

(75) Inventor: Masahito Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 12/742,034

(22) PCT Filed: Nov. 25, 2008

(86) PCT No.: PCT/JP2008/071286
§ 371 (c)(1),
(2), (4) Date: May 7, 2010

(87) PCT Pub. No.: WO2009/072408
PCT Pub. Date: Jun. 11, 2009

(65) Prior Publication Data
US 2010/0265837 A1    Oct. 21, 2010

(30) Foreign Application Priority Data

Dec. 6, 2007    (JP) ................................ 2007-316054

(51) Int. Cl.
*H04W 4/00* (2009.01)
(52) U.S. Cl. ........................................................ 370/329
(58) Field of Classification Search .................. 370/252, 370/332, 334
See application file for complete search history.

(56) References Cited

U.S. PATENT DOCUMENTS

| | | | | |
|---|---|---|---|---|
| 7,437,156 | B2 * | 10/2008 | Tanno et al. | ................... 455/434 |
| 2008/0232503 | A1 * | 9/2008 | Kim | ............................... 375/267 |
| 2008/0268785 | A1 * | 10/2008 | McCoy et al. | ............. 455/67.11 |

FOREIGN PATENT DOCUMENTS

| | | |
|---|---|---|
| JP | 2004-140674 A | 5/2004 |
| JP | 2005-244330 A | 9/2005 |
| JP | 2007-166118 A | 6/2007 |
| WO | 2006/027937 A | 3/2006 |

OTHER PUBLICATIONS

International Search Report for PCT/JP2008/071286, mailed Mar. 3, 2009.
Motorola, "E-UTRA Precoding Feedback overhead", 3GPP TSG RAN WG1 #49, R1-072175, May 7, 2007, pp. 1-4.
Broadcom Corporation, "Uniform Precoding and CQI Best-M -A Hybrid Efficient and Scalable Feedback method for E-URTRA-System Level Analysis", 3GPP TSG-RAN WG1 RAN49-BIS, R1-073082, Jun. 25, 2007, pp. 1-12.
TD-Tech, "Adaptive Precoding matrix Index Feedback for MIMO Downlink in TDD", 3GPP TSG-RAN WG1 #50bis, R1-075007, Nov. 5, 2007, pp. 1-7.

* cited by examiner

*Primary Examiner* — Anh-Vu Ly
*Assistant Examiner* — Mohammad Anwar (57) ABSTRACT

A terminal device is provided for solving the problem of large overhead expended in the PMI calculation process. A reception quality measurement unit (14) measures, for each block frequency band, the reception quality of a signal received by a communication processing unit (13). A reception quality judgment unit (15) determines for each block frequency band whether the reception quality is greater than a first threshold value. A calculation unit (16*a*) individually computes the individual PMI for each frequency band for which the reception quality is equal to or less than the first threshold value, and further, computes for each frequency band for which the reception quality is greater than the first threshold value a common PMI that is common to these frequency bands. A report unit (16*b*) reports to the wireless base station the correspondence between the frequency bands and the individual PMI and common PMI that were computed.

16 Claims, 7 Drawing Sheets

▨ PMI that is common to all bands is reported.

▦ Individual PMI is reported for each band.

☐ PMI is not reported.

Fig.7

| PMI #Common | PMI#0 | PMI#1 | ... | PMI#n |

PMI#Common : PMI common to all bands

PMI#0 : Of PMI that are reported, the PMI of the lowest frequency band

PMI#1 : Of the PMI that are reported, the PMI of the second lowest frequency band

:

PMI#n : Of the PMI that are reported, the PMI of the $(n+1)^{th}$ lowest frequency band

TERMINAL DEVICE AND FEEDBACK METHOD

This application is the National Phase of PCT/JP2008/071286, filed on Nov. 25, 2008, which claims priority based on JP-2007-316054-A for which application was submitted on Dec. 6, 2007 and incorporates all of the disclosures of that application.

TECHNICAL FIELD

The present invention relates to a terminal device and a feedback method, and more particularly to a terminal device and feedback method for carrying out wireless communication using a precoding technology.

BACKGROUND ART

In order to control wireless sources in frequency-selective channels in a wireless communication system that uses a multicarrier transmission mode such as OFDM (Orthogonal Frequency Division Multiplexing), terminals measure the reception quality of channels for each frequency band and report to the wireless base station a CQI (Channel Quality Indicator) that indicates this reception quality.

When a terminal transmits a CQI for each frequency at this time, time is expended for the transmission of the CQI. The channel quality transmission method described in Patent Document 1 is one technique for reducing the time expended in the transmission of CQI.

In this channel quality transmission method, the time taken for transmitting a CQI is reduced by collecting identical CQIs and transmitting them together.

Patent Document 1: JP-A-2007-166118

DISCLOSURE OF THE INVENTION

Problem to be Solved by the Invention

In a wireless communication system such as LTE (Long Term Evolution), a precoding technique is applied before signal transmission to reduce the occurrence of data errors by compensating for distortion (characteristic) of a channel according to the channel condition.

In the precoding technology, at the time of transmitting a signal to a terminal, the wireless base station multiplies the signal with a precoding matrix that indicates the inverse characteristics of the channel characteristics. The terminal carries out decoding after multiplying the signal that was received from the wireless base station with the inverse matrix of the precoding matrix. In this way, distortion of the channel can be compensated for and the occurrence of data errors can be reduced.

The precoding matrix that is multiplied with the signal by the wireless base station is specified in the terminal. More specifically, the terminal calculates a PMI (Precoding Matrix Index) for specifying an appropriate precoding matrix based on the channel state of the subcarrier contained in the frequency band and a codebook that is prepared in advance. The codebook is information in which precoding matrices are placed in correspondence with each PMI.

When a different precoding matrix is used for each frequency band in the precoding technology, the terminal separately calculates PMI for each frequency band, whereby distortion of the channels can be compensated for each of channels having mutually differing characteristics and reception quality can be improved.

However, the load is increased in this case because the terminal calculates PMI separately for each frequency band.

The following technology has been proposed for solving this problem.

Figure 1:
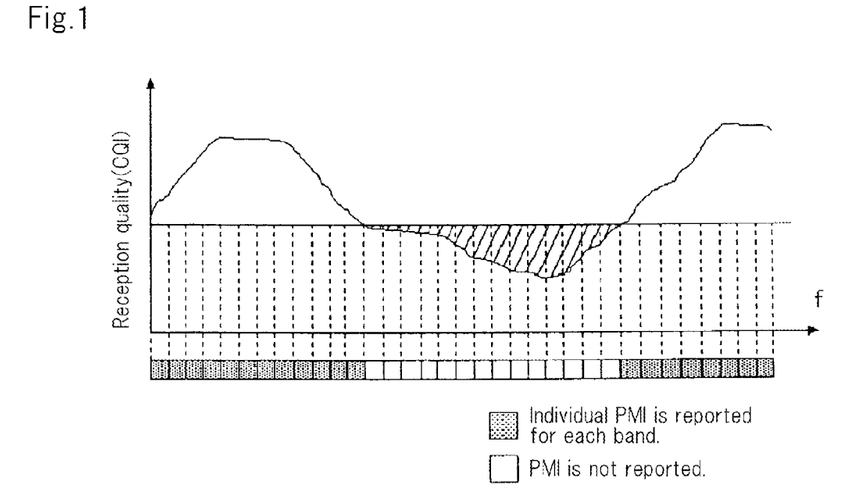
FIG. 1 is an explanatory view showing an example of frequency bands for which PMIs are reported.

First, in 3GPP TSG RAN WGI Meeting #49 R1-072175, a method is proposed whereby a terminal calculates PMI only for frequency bands for which a CQI is reported to the wireless base station, as shown in FIG. 1. Here, a Best-M individual scheme is used as the method of reporting CQI. In the Best-M individual scheme, a terminal successively reports a predetermined number of CQIs from a frequency band having good reception quality.

The number of the PMI to be calculated can thus be reduced and the load of the terminal can thus be reduced.

Figure 2:
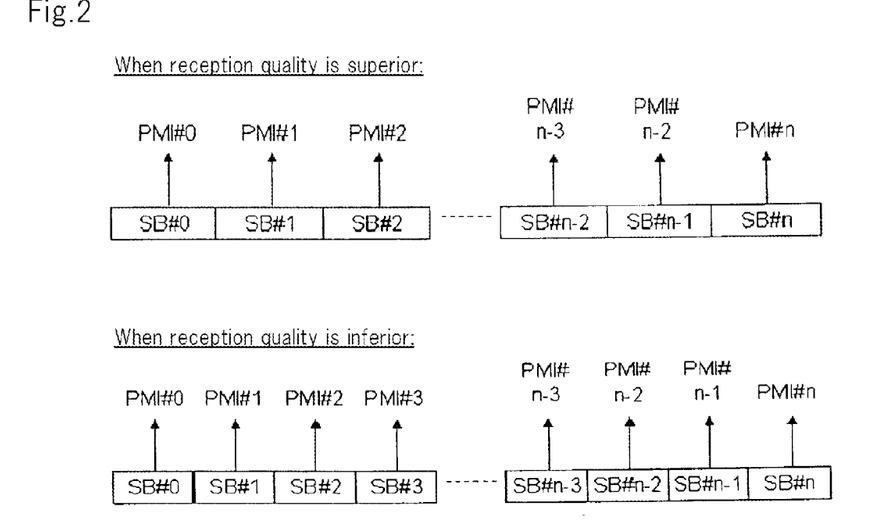
FIG. 2 is an explanatory view showing another example of frequency bands for which PMIs are reported.

In addition to the above-described method, a method was further proposed in 3GPP TSG RAN WGI Meeting #49 bis R1-073082 in which a terminal alters the width of a frequency band for which PMI is calculated according to the reception quality, as shown in FIG. 2. For example, the terminal broadens frequency bands for which PMI is calculated as the reception quality increases.

In this way, the number of PMI to be calculated can be reduced, and the load of the terminal can thus be cut back.

However, the two methods described above suffer from the problem of the large overhead expended in the process of calculating PMI. The reasons for this problem are next described.

In the two methods described above, PMI is calculated individually for each frequency band even for frequency bands having good reception quality. When the reception quality is good, the efficiency of compensating for the channel characteristic is low even when individual precoding matrices are multiplied by the signal for each frequency band because the channel distortion is low from the start. As a result, the overhead expended in the PMI calculation process becomes high.

In the method of 3GPP TSG RAN WGI Meeting #49 bis R1-073082, PMI is calculated individually for each of the frequency bands even for frequency bands having inferior reception quality. When the reception quality is inferior, the possibility of assigning that frequency band during signal transmission is low. As a result, the possibility of using a precoding matrix that is specified by that PMI is low even if the PMI is calculated. As a result, the overhead expended in the PMI calculation process becomes high.

It is therefore an object of the present invention to provide a terminal device and feedback method that solves the above-described problem of increased overhead expended in the PMI calculation process.

Means for Solving the Problem

The terminal device according to the present invention includes: a reception means for receiving a signal from a wireless base station; a measurement means for measuring, for each of frequency bands that have been determined in advance, reception quality of a signal received by the reception means; a judgment means for judging, for each of the frequency bands, whether the reception quality measured by the measurement means is greater than a first threshold value; a calculation means for individually calculating, for each frequency band in which the reception quality is equal to or less than the first threshold value, an individual PMI for specifying a precoding matrix for compensating for channel distortion of that frequency band, and further, calculating, for frequency bands in which the reception quality is greater than the first threshold value, a common PMI for specifying a precoding matrix for compensating for channel distortion common to these frequency bands; and a report means for reporting to the wireless base station the correspondence between the frequency bands and the individual PMI and common PMI that were calculated in the calculation means.

The feedback method according to the present invention is a feedback method carried out by a terminal device that can connect with a wireless base station and includes: a reception step of receiving a signal from the wireless base station; a measurement step of measuring, for each of the frequency bands that have been determined in advance, the reception quality of the received signal; a judgment step of judging, for each of the frequency bands, whether the measured reception quality is greater than a first threshold value or not; an individual calculation step of individually calculating for each of the frequency bands in which the reception quality is no greater than the first threshold value individual PMI for specifying a precoding matrix for compensating for channel distortion of that frequency band; a common calculation step of calculating, for frequency bands in which the reception quality is greater than the first threshold value, a common PMI for specifying a precoding matrix for compensating for common channel distortion for the frequency bands; and a reporting step of reporting to the wireless base station the correspondence between the individual PMI and common PMI that were calculated and the frequency bands.

Effect of the Invention

According to the present invention, overhead expended in the PMI calculation process can be reduced.

BEST MODE FOR CARRYING OUT THE INVENTION

An explanatory embodiment of the present invention is next described with reference to the accompanying figures.

Figure 3:
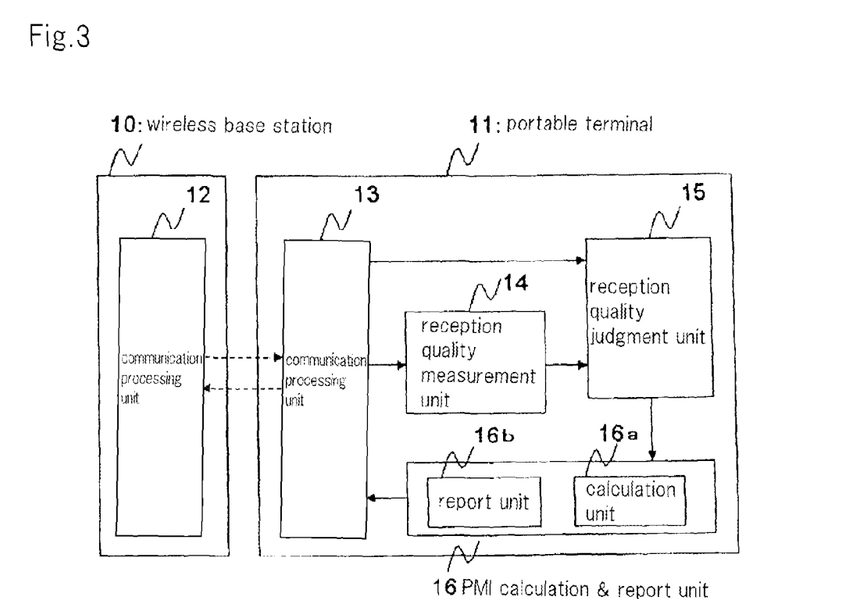
FIG. 3 is a block diagram showing the wireless communication system of the first explanatory embodiment of the present invention.

FIG. 3 is a block diagram showing the wireless communication system of the first explanatory embodiment of the present invention. In FIG. 3, the wireless communication system includes wireless base station 10 and portable terminal 11. Wireless base station 10 and portable terminal 11 can connect with each other wirelessly.

Wireless base station 10 includes communication processing unit 12.

Communication processing unit 12 carries out processing relating to communication.

For example, communication processing unit 12 receives PMI report information for reporting PMI from portable terminal 11. In the present explanatory embodiment, the PMI report information is assumed to include band information indicating the frequency band and a PMI for specifying a precoding matrix for compensating for channel distortion of the frequency band.

In addition, communication processing unit 12 sets a channel for each predetermined frequency band and uses this channel to transmit signals to portable terminal 11.

At this time, upon receiving PMI report information that includes band information that indicates the frequency band for transmitting the signal, communication processing unit 12 multiplies the signal with the precoding matrix specified in the PMI included in the PMI report information and then transmits the multiplied signal.

Communication processing unit 12 is also assumed to use MIMO (Multiple Input Multiple Output) to transmit signals. MIMO is a technology for using a plurality of antennas to transmit and receive signals.

Portable terminal 11 includes communication processing unit 13, reception quality measurement unit 14, reception quality judgment unit 15, and PMI calculation & report unit 16.

Communication processing unit 13 is one example of the reception means and carries out processing relating to communication. For example, communication processing unit 13 receives signals from wireless base station 10.

Reception quality measurement unit 14 is one example of the measurement means. Reception quality measurement unit 14 measures, for each frequency band, the reception quality of the signal that is received by communication processing unit 13. In the present explanatory embodiment, the reception quality is the CQI. However, the reception quality can be altered as appropriate and is not limited to CQI. For example, the reception quality may be the SNR (Signal to Noise Ratio) or CNR (Carrier to Noise Ratio).

Reception quality judgment unit 15 judges, for each frequency band, whether the reception quality measured in reception quality measurement unit 14 is greater than a first threshold value or not. Reception quality judgment unit 15 further determines, for each frequency band, whether the reception quality is greater than a second threshold value. Here, the second threshold value is lower than the first threshold value. In the present explanatory embodiment, the first threshold value and the second threshold value are assumed to be fixed values.

PMI calculation & report unit 16 calculates the PMI, and further, reports the correspondence of the PMI and frequency bands to wireless base station 10. More specifically, PMI calculation & report unit 16 includes calculation unit 16a and report unit 16b, and each unit carries out the processes described below.

Calculation unit 16a calculates a PMI that is common to frequency bands for which the reception quality is determined in reception quality judgment unit 15 to be greater than the first threshold value and frequency bands for which the reception quality is determined by reception quality judgment unit 15 to be equal to or less than the second threshold value. This PMI is hereinbelow referred to as the common PMI.

Calculation unit 16a further individually calculates a PMI for each of frequency bands for which reception quality is determined by reception quality judgment unit 15 to be equal to or less than the first threshold value, and moreover, greater than the second threshold value. These PMI are hereinbelow referred to as individual PMI.

More specifically, when the common PMI is calculated, reception quality measurement unit 14 estimates the subcarrier channel states contained in all frequency bands, and calculation unit 16a calculates the common PMI based on the estimated channel states.

When calculating the individual PMI, calculation unit 16a extracts the channel states of subcarriers contained in the frequency bands that correspond to the individual PMI from the channel states of subcarriers contained in all frequency bands and calculates individual PMI based on the extracted channel states.

More specifically, calculation unit 16a first uses Equation 1 to calculate a metric $MSE(F_i)$ for each precoding matrix $F_i$ contained in a codebook that is held in advance. The codebook is information in which a precoding matrix is placed in correspondence with each PMI.

$$MSE(F_i) = \frac{\varepsilon}{M}\left[I + \frac{\varepsilon}{MN}F_i^* H^* H F_i\right]^{-1} \quad \text{Equation (1)}$$

Here, H is a channel estimation matrix that indicates the channel state, M is the number of transmission antennas of wireless base station 10, ε is the transmission power of wireless base station 10, and N is the noise power. In addition, ε/N is the SN ratio. If it is assumed that I is the identity matrix of M×M and A is a matrix, then:

$$A^{-1} \quad \text{Equation (2)}$$

is the inverse matrix of A, and $$A^* \quad \text{Equation (3)}$$

represents the conjugate transpose matrix of A. In addition, A represents a matrix.

The channel estimation matrix is a matrix having as components a channel estimate value for each subcarrier that corresponds to each of M transmission antennas. Each channel estimate value is a value indicating the channel state of a particular subcarrier that was transmitted by a particular transmission antenna.

When calculating the common PMI, calculation unit 16a uses, as the channel estimation matrix, a matrix having as components the channel estimate values of each subcarrier contained in all frequency bands for each of the transmission antennas. As a result, the channel estimation matrix is a matrix of: [the number of subcarriers contained in all frequency bands]×M.

In addition, when calculating an individual PMI, calculation unit 16a uses as the channel estimation matrix, a matrix having as components the channel estimate values of each subcarrier contained in the frequency band that corresponds to the individual PMI for each of the transmission antennas. As a result, the channel estimation matrix is a matrix of: [the number of subcarriers contained in the frequency band that corresponds to the individual PMI]×M.

The channel estimate values, the number N of transmission antennas, transmission power ε, and SN ratio are measured in reception quality measurement unit 14.

Calculation unit 16a uses Equation 4 to calculate the PMI from within metric $MSE(F_i)$.

$$F = \arg\min_{F_i \in F} m(MSE(F_i)) \quad \text{Equation (4)}$$

Here, m(A) indicates the trace or the matrix expression of A. In addition, F indicates the set of precoding matrices contained in the codebook that is held in advance. In other words, calculation unit 16a finds, as the PMI, the precoding matrix $F_i$ that gives the minimum value among the traces or matrix expressions of metric $MSE(F_i)$.

Figure 4:
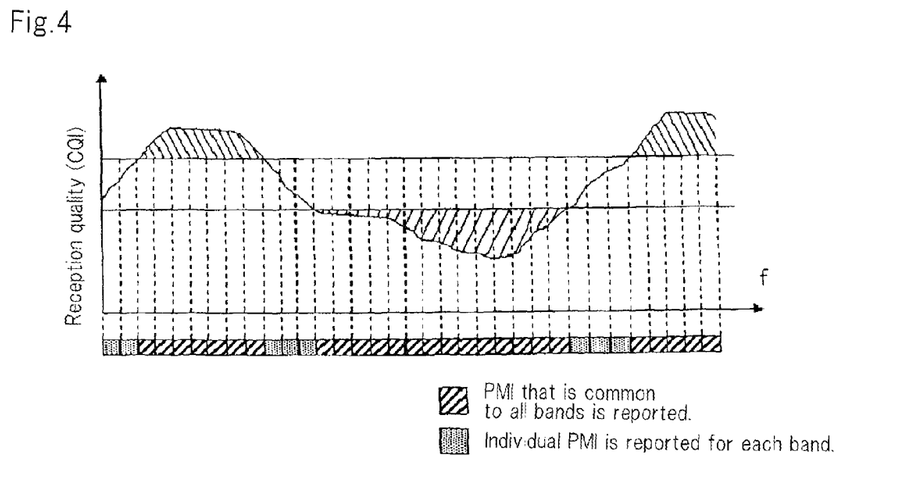
FIG. 4 is an explanatory view showing an example of a frequency bands for which a common PMI and an individual PMI are reported.

FIG. 4 is an explanatory view showing an example of the frequency band for which the common PMI and individual PMI are reported. In FIG. 4, an individual PMI is individually calculated for each of the frequency bands for which the CQI is equal to or less than the first threshold value, and moreover, greater than the second threshold value. In addition, for the other frequency bands, the common PMI takes the place of the PMI of the frequency bands and an individual PMI is not calculated. A common PMI is calculated that is common to these frequency bands.

Returning to FIG. 3, report unit 16b reports to wireless base station 10 the correspondence between the frequency bands and the individual PMI and common PMI that were calculated by calculation unit 16a. For example, report unit 16b reports to wireless base station 10 PMI report information that contains the PMI that was computed by calculation unit 16a and band information that indicates the frequency bands that correspond to the PMI.

The operation is next described.

Figure 5:
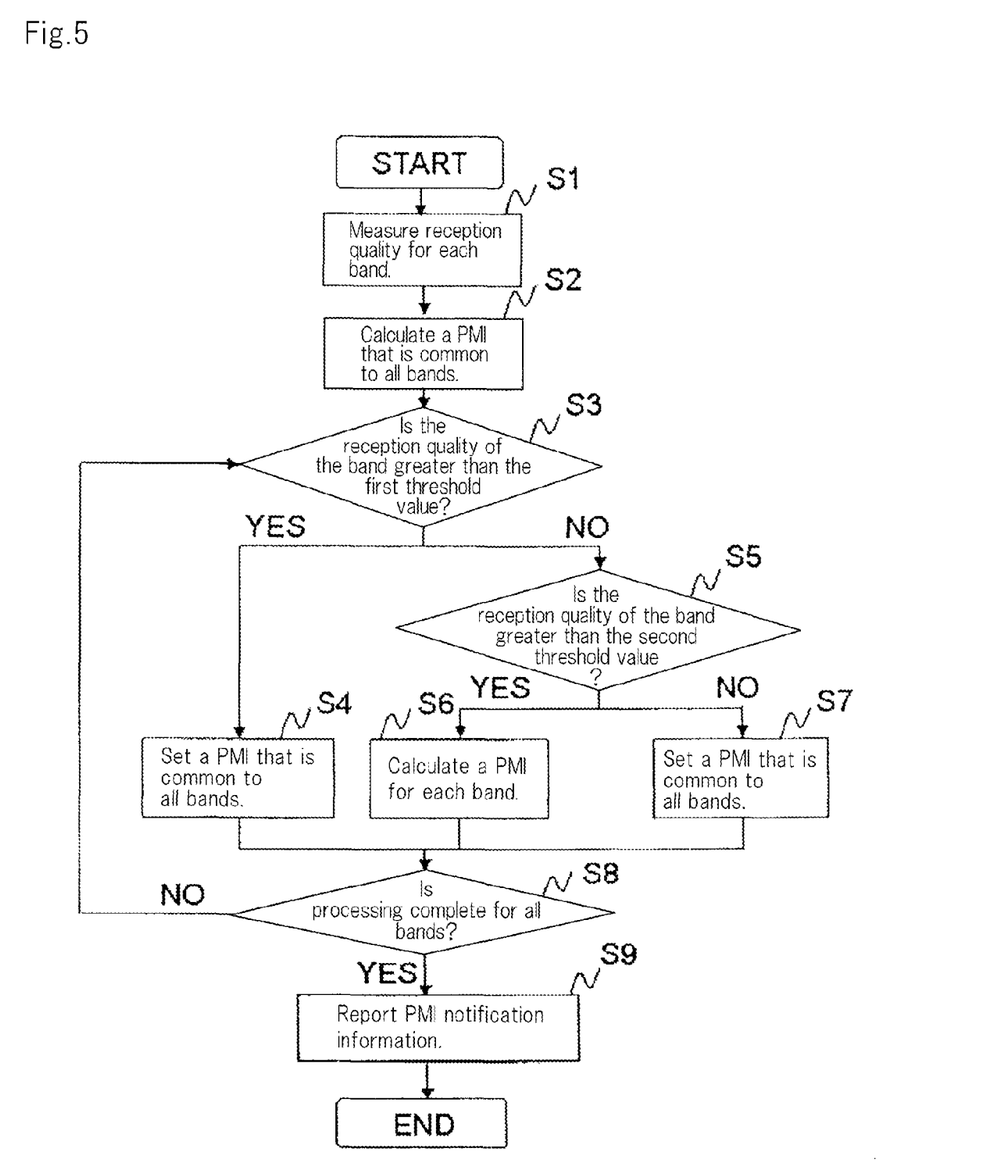
FIG. 5 is a flow chart for explaining an example of the operation of portable terminal 11.

FIG. 5 is a flow chart for explaining an example of the operation of portable terminal 11.

In Step S1, communication processing unit 13 receives a signal from communication processing unit 12 of wireless base station 10 and transmits this signal to reception quality measurement unit 14.

Reception quality measurement unit 14 measures, for each frequency band, the reception quality of the signal that was received by communication processing unit 13. Reception quality measurement unit 14 generates quality information that places the reception quality in correspondence with each frequency band.

In addition, reception quality measurement unit 14 finds computation information that is used in the computation of the PMI. The computation information includes a channel estimation matrix, the transmission antenna number, the transmission power, and the SN ratio.

Here, the channel estimation matrix is a matrix that has as components channel estimate values of each of the subcarriers that are included in all frequency bands corresponding to each of the transmission antennas. Reception quality measurement unit 14 further finds each channel estimate value based on pilot symbols contained in the signal from wireless base station 10 and pilot symbols that are unique to wireless base station 10.

Reception quality measurement unit 14 transmits the quality information and computation information to reception quality judgment unit 15. Upon receiving the quality information and computation information, reception quality judgment unit 15 executes Step S2.

In Step S2, reception quality judgment unit 15 transmits the computation information to calculation unit 16a.

Calculation unit 16a, upon receiving the computation information, calculates the common PMI based on the computation information and the codebook.

More specifically, calculation unit 16a first substitutes into Equation 1 the channel estimation matrix, transmission antenna number, transmission power, and SN ratio in the computation information for each precoding matrix $F_i$ contained in the codebook and calculates metric $MSE(F_i)$.

Calculation unit 16a next uses Equation 4 to find, as the common PMI, precoding matrix $F_i$ that gives the minimum value among the traces or metric $MSE(F_i)$.

Upon calculating the common PMI, calculation unit 16a transmits a start request indicating the start of determination to reception quality judgment unit 15. Upon receiving the reception quality, reception quality judgment unit 15 executes Step S3.

In Step S3, reception quality judgment unit 15 selects band information in the reception information, and determines whether the reception quality that was placed in correspondence with the band information is greater than the first threshold value. Reception quality judgment unit 15 here selects one item of band information from among the band information that has still not been selected.

Reception quality judgment unit 15 executes Step S4 when the reception quality is greater than the first threshold value and executes Step S5 when the reception quality is equal to or less than the first threshold value.

In Step S4, reception quality judgment unit 15 transmits the band information that was selected and superior information indicating that reception quality is superior to calculation unit 16a. Calculation unit 16a, having received the band information and superior information, generates PMI report information that includes the common PMI that was computed in Step S2 and the band information, and saves the PMI report information. Calculation unit 16a, after completing Step S4, executes Step S8.

Alternatively, in Step S5, reception quality judgment unit 15 determines whether the reception quality that was placed in correspondence with the band information that was selected in Step S3 is greater than the second threshold value. Reception quality judgment unit 15 executes Step S6 if the reception quality is greater than the second threshold value and executes Step S7 if the reception quality is equal to or less than the second threshold value.

In Step S6, reception quality judgment unit 15 transmits to calculation unit 16a the selected band information and intermediate information indicating that the reception quality is intermediate. Upon receiving the band information and intermediate information, calculation unit 16a calculates individual PMI based on the computation information received in Step S2 and on the codebook.

More specifically, calculation unit 16a extracts from the channel estimation matrices in the computation information a partial matrix indicating the channel state of subcarriers contained in the frequency band that is indicated by the band information.

Calculation unit 16a next substitutes into Equation 1 the extracted partial matrix and the transmission antenna number, transmission power, and SN ratio in the computation information for each precoding matrix $F_i$ contained in the codebook to calculate metric $MSE(F_i)$. Calculation unit 16a here substitutes into Equation 1 the partial matrix as the channel estimation matrix.

Calculation unit 16a then uses Equation 4 to find, as the PMI, precoding matrix $F_i$ that gives the minimum value among the traces or matrix expressions of metric $MSE(F_i)$.

Upon computing the individual PMI, calculation unit 16a generates PMI report information that includes the individual PMI and band information and holds this PMI report information. After completing Step S6, calculation unit 16a executes Step S8.

In Step S7, reception quality judgment unit 15 transmits to calculation unit 16a the band information that was selected and inferior information indicating that the reception quality is inferior. Calculation unit 16a, having received the band information and inferior information, generates PMI report information that includes the common PMI that was calculated in Step S2 and the band information, and holds the PMI report information. After completing Step S7, calculation unit 16a executes Step S8.

In Step S8, calculation unit 16a transmits to reception quality judgment unit 15 computation completion information indicating that the PMI has been computed.

Upon receiving the computation completion information, reception quality judgment unit 15 determines whether or not all band information has been selected. Reception quality judgment unit 15 executes Step S9 if all band information has been selected and executes Step S3 if unselected band information remains.

In Step S9, reception quality judgment unit 15 transmits to calculation unit 16a report instructions indicating that PMI report information should be reported.

Upon receiving the report instructions, calculation unit 16a transmits the PMI report information to report unit 16b. Report unit 16b, having received the PMI report information, transmits the PMI report information to wireless base station 10 to complete the process.

In addition, Steps S1 to S9 may be repeated while wireless base station 10 and portable terminal 11 are connected.

The effect is next described.

In the present explanatory embodiment, reception quality measurement unit 14 measures the reception quality of a signal received by communication processing unit 13 for each block frequency band. Reception quality judgment unit 15 determines whether the reception quality is greater than a first threshold value for each block frequency band. Calculation unit 16a individually computes an individual PMI for each frequency band for which the reception quality is equal to or less than the first threshold value. Calculation unit 16a further computes, for frequency bands for which the reception quality is greater than the first threshold value, a common PMI that is shared among these frequency bands. Report unit 16b reports to the wireless base station the correspondence between the frequency bands and the individual PMI and common PMI that were computed.

In this case, for frequency bands in which the reception quality is greater than the first threshold value, a common PMI is computed that is shared among these frequency bands. The need for individually computing PMI for each of frequency bands in which reception quality is good is therefore eliminated, and the overhead expended for the PMI computation process can be reduced. Accordingly, the load upon portable terminal 11 can be reduced, and, for example, the life of the power supply of portable terminal 11 can be extended.

In the present explanatory embodiment, reception quality judgment unit 15 determines for each frequency band whether the reception quality is greater than a second threshold value that is lower than the first threshold value. Calculation unit 16a individually computes an individual PMI for each frequency band for which the reception quality is greater than the second threshold value.

In this case, an individual PMI is individually computed for each frequency band for which the reception quality is greater than the second threshold value.

Eliminating the need to individually compute a PMI for each frequency band for which the reception quality is inferior enables a reduction of the overhead expended in the PMI computation process.

In the present explanatory embodiment, calculation unit 16a computes, for frequency bands in which the reception quality is greater than the first threshold value and frequency bands in which the reception quality is equal to or less than the second threshold value, a common PMI that is common to these frequency bands.

In this case, by computing only once a PMI that is common to frequency bands in which the reception quality is superior and to frequency bands in which the reception quality is inferior, a PMI can be computed for frequency bands in which the reception quality is inferior. Accordingly, a PMI can be computed for frequency bands in which the reception quality is inferior while reducing the overhead expended in the PMI computation process.

The second explanatory embodiment is next described. The following explanation chiefly regards functions that differ from the first explanatory embodiment.

In the present explanatory embodiment, calculation unit 16a computes PMI only for frequency bands for which reception quality judgment unit 15 has determined that reception quality is greater than the second threshold value.

More specifically, calculation unit 16a individually computes an individual PMI for each frequency band for which the reception quality is equal to or less than the first threshold value and for each frequency band for which the reception quality is greater than the second threshold value. For frequency bands for which the reception quality is greater than the first threshold value, calculation unit 16a computes a common PMI that is common to these frequency bands. Calculation unit 16a then does not compute PMI for frequency bands for which the reception quality is equal to or less than the second threshold value.

Figure 6:
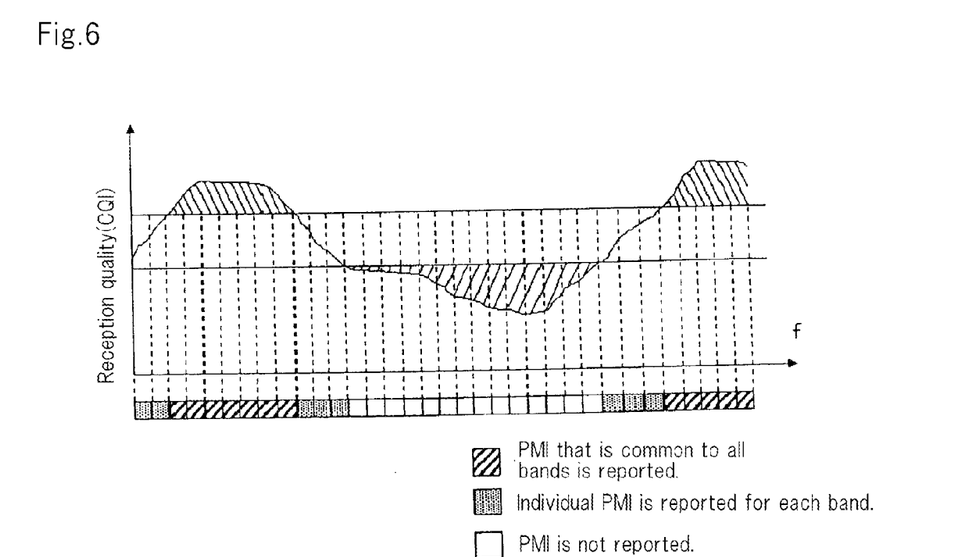
FIG. 6 is an explanatory view showing another example of frequency bands for which a common PMI and individual PMI are reported.

FIG. 6 is an explanatory view showing an example of the frequency band for reporting the common PMI and individual PMI. In FIG. 6, an individual PMI is individually computed for each frequency band for which the reception quality is equal to or less than the first threshold value, and moreover, for which the reception quality is greater than the second threshold value. For frequency bands for which the reception quality is greater than the first threshold value, a common PMI that is common to these frequency bands is computed. Finally, a PMI is not computed in frequency bands for which the reception quality is equal to or less than the second threshold value.

Accordingly, as in the first explanatory embodiment, the need to individually compute PMI is eliminated for each frequency band in which the reception quality is inferior, and the overhead expended for the PMI computation process can therefore be reduced.

In the present explanatory embodiment, report unit 16b reports the correspondence between the PMI and frequency bands by the following format.

Report unit 16b transmits quality information, first threshold value, and second threshold value to wireless base station 10. Report unit 16b further transmits information in which the PMI are arranged in a predetermined order as PMI report information.

Figure 7:
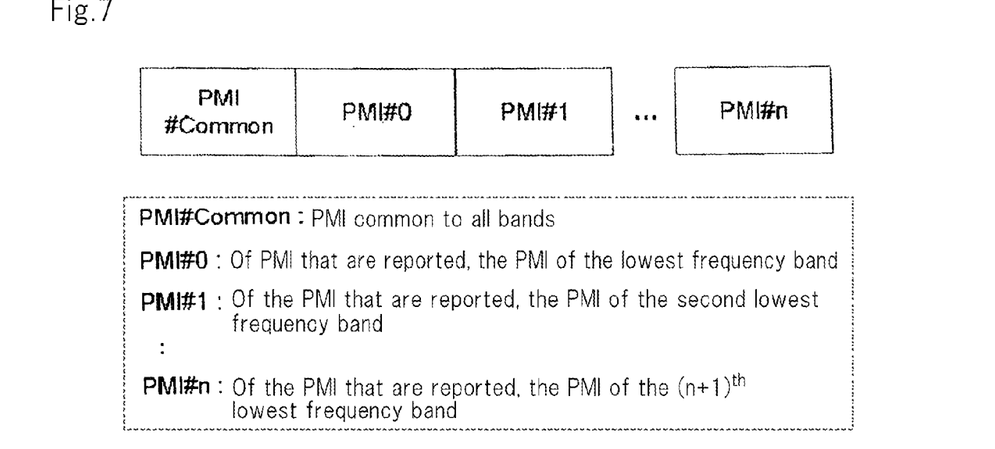
FIG. 7 is an explanatory view showing an example of PMI report information.

FIG. 7 is an explanatory view showing an example of the PMI report information. In the PMI report information in FIG. 7, the common PMI is set as the first PMI and, in the second and succeeding PMI, individual PMI are arranged in order from the frequency band having the lowest frequency.

Communication processing unit 12 of wireless base station 10, upon receiving the quality information, first threshold value, second threshold value, and PMI report information, specifies the PMI of the frequency band for each frequency band based on the quality information, first threshold value, second threshold value, and PMI report information.

In the case of FIG. 7, for example, communication processing unit 12 first determines for each frequency band whether the reception quality is greater than the first threshold value or not based on the quality information received from portable terminal 11. Communication processing unit 12 further determines for each frequency band whether the reception quality is greater than the second threshold value.

Communication processing unit 12 then specifies the first PMI of the PMI report information as the PMI of frequency bands for which the reception quality is greater than the first threshold value. Communication processing unit 12 further successively specifies, as the PMI for frequency bands for which the reception quality is equal to or less than the first threshold value and moreover, greater than the second threshold value, PMI in order of lower frequency from the second PMI of the PMI report information.

Accordingly, the common PMI in all frequency bands need only be reported once, and the amount of PMI transmissions can therefore be reduced. As a result, interference can be reduced in all uplink lines.

The operation is next described.

Figure 8:
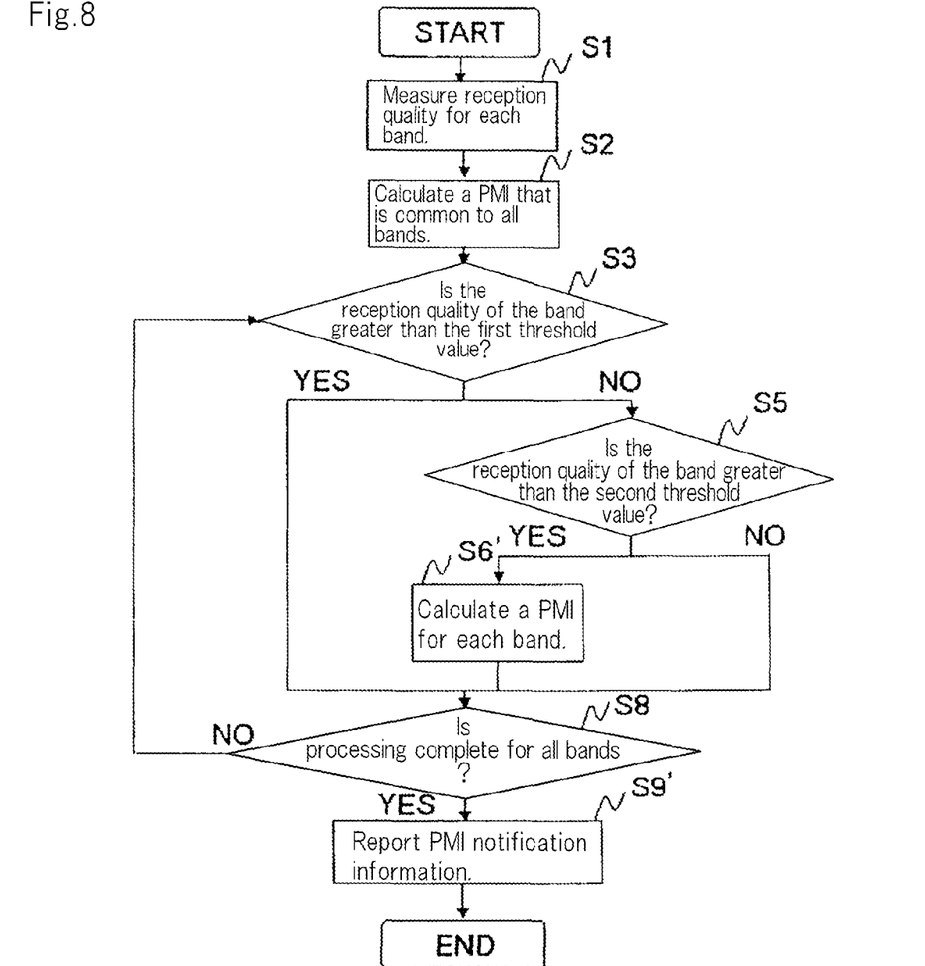
FIG. 8 is a flow chart for explaining another example of the operation of portable terminal 11.

FIG. 8 is a flow chart for explaining an example of the operation of portable terminal 11 of the present explanatory embodiment. In FIG. 8, the same reference numbers are given to processes that are identical to FIG. 5 and redundant explanation of these processes is omitted.

In Step S3, reception quality judgment unit 15 executes Step S8 when the reception quality is greater than the first threshold value and executes Step S5 when the reception quality is equal to or less than the first threshold value.

In Step S5, reception quality judgment unit 15 executes Step S6' if the reception quality is greater than the second threshold value and executes Step S8 if the reception quality is equal to or less than the second threshold value.

In Step S6', reception quality judgment unit 15 transmits to calculation unit 16a the selected band information and intermediate information indicating that the reception quality is intermediate.

Calculation unit 16a, upon receiving the band information and intermediate information, computes the individual PMI based on the computation information received in Step S2 and the codebook. Calculation unit 16a holds this individual PMI and the band information in mutual correspondence. Upon completion of Step S6', calculation unit 16a executes Step S8.

Alternatively, when all band information has been selected in Step S8, reception quality judgment unit 15 executes Step S9'.

In Step S9', reception quality judgment unit 15 transmits report instructions to calculation unit 16a.

Upon receiving the report instructions, calculation unit 16a generates PMI report information based on the common PMI and PMI hold information. For example, calculation unit 16a first generates PMI report information that takes the common PMI computed in Step S2 as the first PMI. Calculation unit 16a next arranges the held individual PMI in order from the second item of PMI report information starting from the individual PMI that is placed in correspondence with band information that indicates the frequency band having the lowest frequency.

When PMI report information has been generated, calculation unit 16a transmits the PMI report information to report unit 16b. Report unit 16b, having received the PMI report information, transmits the PMI report information to wireless base station 10.

The third explanatory embodiment is next described.

In each of the above-described explanatory embodiments, the first threshold value and second threshold value are fixed values, but in the present explanatory embodiment, these values are found based on communication volume information that relates to the amount of communication of wireless base station 10.

More specifically, communication processing unit 12 of wireless base station 10 transmits communication volume information to portable terminal 11. The communication volume information includes, for example, at least one of: the number of terminal devices connected to wireless base station 10 (hereinbelow also referred to as the number of connected users) and the information volume of signals that wireless base station 10 transmits to its own device (portable terminal 11) (hereinbelow also referred to as the amount of communication data).

Communication processing unit 13 of portable terminal 11 receives the communication volume information from wireless base station 10.

Reception quality judgment unit 15 finds the first threshold value or the second threshold value or both the first and second threshold value based on the communication volume information received by communication processing unit 13.

For example, when the communication volume information is the number of connected users, reception quality judgment unit 15 decreases the first threshold value and increases the second threshold value as the number of connected users increases.

If the communication volume information is the amount of communication data, reception quality judgment unit 15 decreases the first threshold value and increases the second threshold value as the amount of information decreases.

Alternatively, reception quality judgment unit 15 may also find the first threshold value and second threshold value independently, for example, finding the first threshold value based on the number of connected users and finding the second threshold value based on the amount of communication data.

Figure 9A:
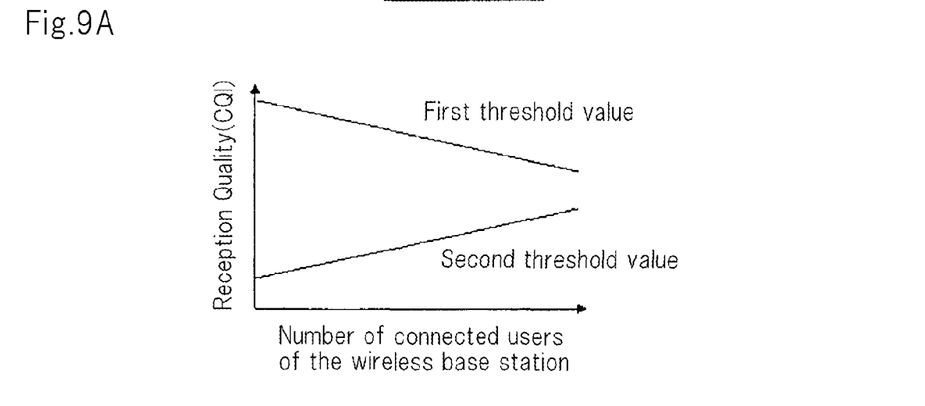
FIG. 9A is an explanatory view showing an example of the relation between the number of connected users and threshold values.

FIG. 9 is an explanatory view showing an example of the relation between the communication volume information and threshold values. More specifically, FIG. 9A is an explanatory view showing an example of the relation between the number of connected users and the first threshold value and second threshold value. In FIG. 9A, the first threshold value decreases and the second threshold value increases as the number of connected users increases.

Figure 9B:
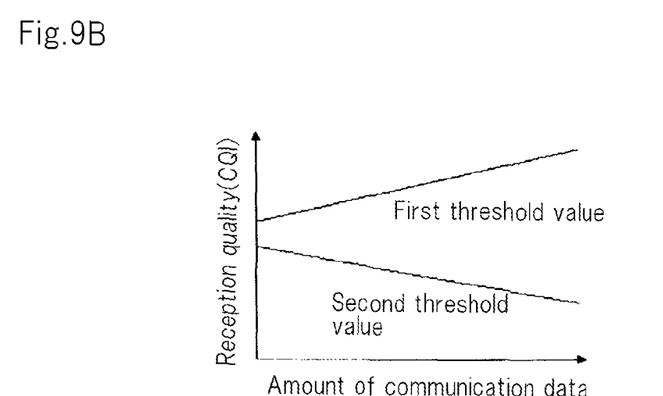
FIG. 9B is an explanatory view showing an example of the relation between the amount of communication data and threshold values.

FIG. 9B is an explanatory view showing an example of the relation between the amount of communication data and the first threshold value and second threshold value. In FIG. 9A, the first threshold value decreases and the second threshold value increases as the amount of communication data decreases.

The effect is next described.

In the present explanatory embodiment, communication processing unit 13 receives communication volume information relating to the amount of communication of wireless base station 10. Reception quality judgment unit 15 finds the first threshold value or the second threshold value or both the first and second threshold value based on the communication volume information received by communication processing unit 13.

In this case, the first threshold value or the second threshold value or both the first and second threshold value are found based on the communication volume information. As a result, the PMI transmission volume can be adjusted according to the volume of communication of wireless base station 10.

In the present explanatory embodiment, the communication volume information includes the number of terminal devices that are connected to the wireless base station 10 (number of connected users).

Normally, the amount of PMI transmission of the entire wireless communication system increases and the interference of uplink lines increases as the number of connected users increases. In the present explanatory embodiment, if, for example, the first threshold value is decreased and the second threshold value is increased as the number of connected users increases, the frequency bands for which individual PMI is individually computed decreases, whereby the amount of PMI transmission for the entire wireless communication system can be reduced and the interference of uplink lines can be reduced. In addition, the load placed upon portable terminal 11 can be reduced.

In the present explanatory embodiment, the communication volume information includes the amount of information of signals transmitted by wireless base station 10 to the device in question (communication data volume).

In this case, if, for example, the first threshold value is decreased and the second threshold value is increased as the communication data volume decreases, the computation of excessive PMI can be reduced when the amount of communication data is small, whereby the interference of uplink lines can be reduced. In addition, the load placed on portable terminal 11 can be reduced.

The fourth explanatory embodiment is next described.

In the present explanatory embodiment, the simplest configuration of the portable terminal of the present invention is described.

Figure 10:
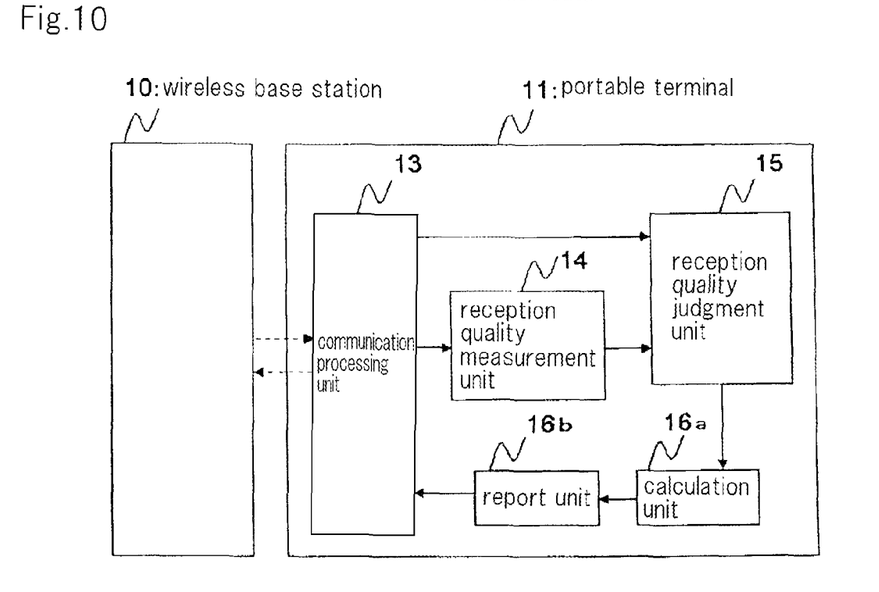
FIG. 10 is a block diagram showing the configuration of a portable terminal of the fourth explanatory embodiment of the present invention.

FIG. 10 is a block diagram showing the configuration of the portable terminal of the present explanatory embodiment. In FIG. 10, portable terminal 11 includes: communication processing unit 13, reception quality measurement unit 14, reception quality judgment unit 15, calculation unit 16a, and report unit 16b. In addition, portable terminal 11 and wireless base station 10 can connect with each other.

Communication processing unit 13 receives signals from wireless base station 10.

Reception quality measurement unit 14 is an example of the measurement means. Reception quality measurement unit 14 measures reception quality of the signal received by communication processing unit 13 for each frequency band. The reception quality is, for example, a CQI.

Reception quality judgment unit 15 determines, for each frequency band, whether the reception quality measured in reception quality measurement unit 14 is greater than a first threshold value.

Calculation unit 16a computes a common PMI for frequency bands for which the reception quality has been determined in reception quality judgment unit 15 to be greater than the first threshold value. Calculation unit 16a further individually computes an individual PMI for each frequency band for which reception quality has been determined in reception quality judgment unit 15 to be equal to or less than the first threshold value. The PMI computation method is assumed to be identical to the first explanatory embodiment.

Figure 11:
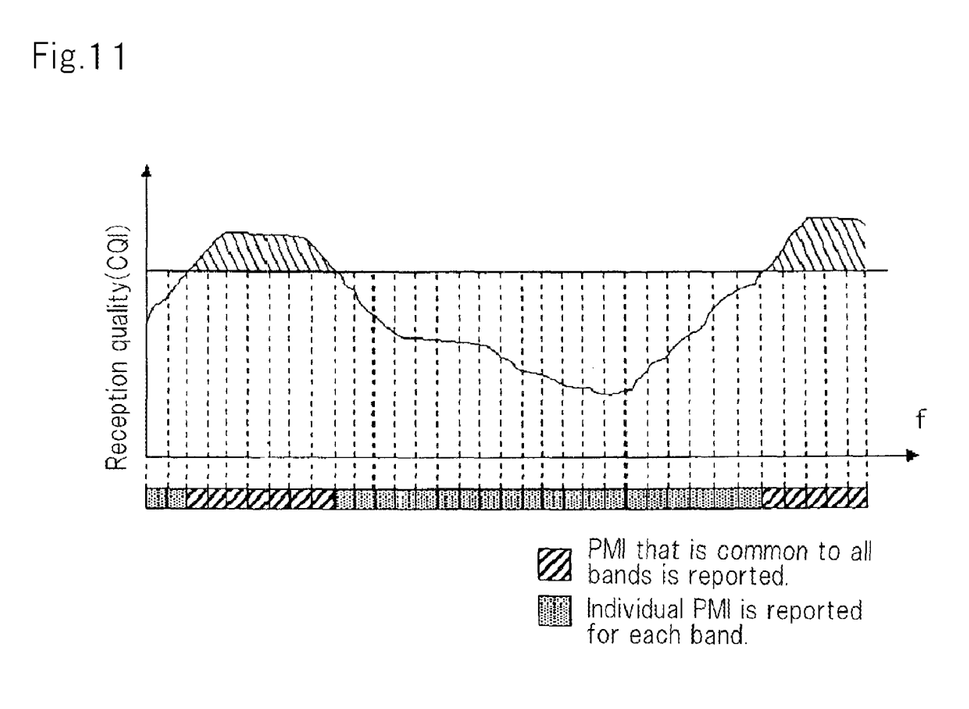
FIG. 11 is an explanatory view showing another example of the frequency bands for which a common PMI and an individual PMI are reported.

FIG. 11 is an explanatory view showing an example of the frequency bands for which the common PMI and individual PMI are reported. In FIG. 11, an individual PMI is computed individually for each frequency band for which the reception quality is equal to or less than the first threshold value. In addition, for frequency bands for which the reception quality is greater than the first threshold value, a common PMI is computed that is common to these frequency bands.

Returning to FIG. 10, report unit 16b reports to wireless base station 10 the correspondence between frequency bands and the PMI that was computed by calculation unit 16a. For example, report unit 16b reports to wireless base station 10 PMI report information that includes the PMI computed by calculation unit 16a and band information showing the frequency bands that correspond to these PMI numbers.

Operation is next described.

In the first explanatory embodiment, reception quality judgment unit 15 executed Step S7 when the reception quality is equal to or less than the second threshold value in Step S5 of FIG. 5. In the present explanatory embodiment, reception quality judgment unit 15 executes Step S8 when the reception quality is greater than the second threshold value.

The operations are otherwise identical to the first explanatory embodiment and further explanation is therefore omitted.

The effect is next described.

In the present explanatory embodiment, as in the first explanatory embodiment, reception quality measurement unit 14 measures the reception quality of the signal received by communication processing unit 13 for each block frequency band. Reception quality judgment unit 15 determines for each block frequency band whether or not the reception quality is greater than the first threshold value or not. Calculation unit 16a individually computes an individual PMI for each frequency band for which the reception quality is equal to or less than the first threshold value. For frequency bands for which the reception quality is greater than the first threshold value, calculation unit 16a further computes a common PMI that is common to these frequency bands. Report unit 16b reports to the wireless base station the correspondence between the frequency bands and the individual PMI and common PMI that have been computed.

As a result, the overhead expended for the PMI computation process can be reduced.

Although the invention of the present application has been described above with reference to explanatory embodiments, the invention of the present application is not limited to the above-described explanatory embodiment. The configuration and details of invention of the present application are open to various modifications within the scope of the invention that will be understood by anyone of ordinary skill in the art.

For example, although description regarded portable telephone terminals that use LTE in each of the explanatory embodiments, the present invention can also be applied in wireless communication systems such as wireless LAN or portable telephone terminals such as portable telephones that employ FDM (Frequency Division Multiplexing) or OFDM in which precoding technology is applied.

What is claimed is:

1. A terminal device comprising:
a receptor that receives a signal from a wireless base station;
a measurement unit that measures, for each of frequency bands that have been determined in advance, reception quality of the signal received by said receptor;
a judgment unit that determines, for each of said frequency bands, whether the reception quality measured by said measurement unit is greater than a first threshold value;
a calculation unit that individually calculates, for each frequency band in which said reception quality is equal to or less than said first threshold value, an individual PMI for specifying a precoding matrix for compensating for channel distortion of that frequency band, and further, for frequency bands in which said reception quality is greater than said first threshold value, calculating a common PMI for specifying a precoding matrix for compensating for channel distortion common to those frequency bands; and
a report unit that reports to said wireless base station the correspondence between said frequency bands and individual PMI and common PMI that were calculated in said calculation unit.

2. The terminal device as set forth in claim 1, wherein:
said judgment unit determines for each of said frequency bands whether reception quality measured by said measurement means is greater than a second threshold value that is less than said first threshold value; and
said calculation unit individually calculates said individual PMI for each frequency band wherein said reception quality is greater than said second threshold value.

3. The terminal device as set forth in claim 2, wherein said calculation unit calculates, for frequency bands in which said reception quality is greater than said first threshold value and for frequency bands in which said reception quality is equal to or less than said second threshold value, said common PMI that is common to these frequency bands.

4. The terminal device as set forth in claim 2, wherein:
said receptor receives from said wireless base station communication volume information relating to the amount of communication of said wireless base station; and
said judgment unit finds said second threshold value based on said communication volume information.

5. The terminal device as set forth in claim 4, wherein said judgment unit finds said first threshold value based on said communication volume information.

6. The terminal device as set forth in claim 1, wherein:
said receptor receives from said wireless base station communication volume information that relates to the amount of communication of the wireless base station; and
said judgment unit finds said first threshold value based on said communication volume information.

7. The terminal device as set forth in claim 6, wherein said communication volume information includes the number of terminal devices connected to said wireless base station.

8. The terminal device as set forth in claim 6, wherein said communication volume information includes the amount of information in signals transmitted by said wireless base station to the terminal device.

9. A feedback method carried out by a terminal device that can connect to a wireless base station, comprising:
receiving a signal from said wireless base station;
measuring, for each of frequency bands that have been determined in advance, the reception quality of said received signal;
determining, for each of said frequency bands, whether or not said measured reception quality is greater than a first threshold value;
individually calculating, for each of frequency bands in which said reception quality is equal to or less than said first threshold value, an individual PMI for specifying a precoding matrix for compensating for channel distortion of that frequency band;

calculating, for frequency bands wherein said reception quality is greater than said first threshold value, a common PMI for specifying a precoding matrix for compensating for channel distortion common to those frequency bands; and reporting to said wireless base station the correspondence between said frequency bands and the individual PMI and common PMI that were calculated.

10. The feedback method as set forth in claim 9, further comprising:

determining, for each said frequency band, whether said measured reception quality is greater than a second threshold value that is smaller than said first threshold value;

wherein, in said individually calculating, said individual PMI is individually calculated for each frequency band where said reception quality is greater than said second threshold value.

11. The feedback method as set forth in claim 10, wherein, in said calculating, said common PMI is calculated for frequency bands where said reception quality is greater than said first threshold value and for frequency bands where said reception quality is equal to or less than said second threshold value.

12. The feedback method as set forth in claim 10, further comprising:

receiving from said wireless base station communication volume information relating to the amount of communication of said wireless base station; and finding said second threshold value based on said communication volume information.

13. The feedback method as set forth in claim 12, further comprising finding said first threshold value based on said communication volume information.

14. The feedback method as set forth in claim 9, further comprising:

receiving from said wireless base station communication volume information relating to the amount of communication of said wireless base station; and finding said first threshold value based on said communication volume information.

15. The feedback method as set forth in claim 14, wherein said communication volume information includes the number of terminal devices connected to said wireless base station.

16. The feedback method as set forth in claim 14, wherein said communication volume information includes the amount of information transmitted by said wireless base station to the terminal device.

* * * * *